(12) United States Patent
Pate

(10) Patent No.: US 7,083,287 B2
(45) Date of Patent: Aug. 1, 2006

(54) TILT DETECTION IN ILLUMINATION SOURCE

(75) Inventor: Michael A Pate, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/437,552

(22) Filed: May 13, 2003

(65) Prior Publication Data

US 2004/0227904 A1 Nov. 18, 2004

(51) Int. Cl.
 G03B 21/20 (2006.01)
 G03B 21/14 (2006.01)
 H04N 3/26 (2006.01)
 F21S 8/00 (2006.01)
 F21V 17/02 (2006.01)
 F21V 21/30 (2006.01)
 F21V 7/00 (2006.01)

(52) U.S. Cl. ............................. 353/85; 353/87; 353/70; 348/745; 362/21; 362/282; 362/287; 362/296

(58) Field of Classification Search ................. 353/85, 353/87, 69, 70, 119, 121, 122; 348/745, 348/746, 806; 362/21, 269, 277, 282, 285, 362/287, 296
See application file for complete search history.

(56) References Cited

U.S. PATENT DOCUMENTS

| | | | |
|---|---|---|---|
| 2,754,497 A | 7/1956 | Wolpert | |
| 3,627,241 A | 12/1971 | Santirocco et al. | |
| 3,789,212 A | 1/1974 | Wagner | |
| 3,988,626 A | 10/1976 | Boudouris | |
| 4,516,329 A | 5/1985 | Dilcox | |
| 5,689,545 A | 11/1997 | Hopkins | |
| 5,800,032 A | 9/1998 | Uchiyama et al. | |
| 6,013,911 A * | 1/2000 | Hibbard et al. | 250/205 |
| 6,043,500 A | 3/2000 | Akimoto | |
| 6,097,449 A | 8/2000 | Yamamoto et al. | |
| 6,115,482 A | 9/2000 | Sears et al. | |
| 6,137,567 A | 10/2000 | Ohoka et al. | |
| 6,137,568 A | 10/2000 | Ohtomo et al. | |
| 6,144,308 A | 11/2000 | Dunne | |
| 6,416,185 B1 * | 7/2002 | Smith | 353/69 |
| 6,520,647 B1 | 2/2003 | Raskar | |
| 6,578,970 B1 * | 6/2003 | Paquette | 353/99 |
| 2002/0021418 A1 | 2/2002 | Raskar | |
| 2003/0085849 A1 * | 5/2003 | Grabert | 345/30 |
| 2004/0036844 A1 * | 2/2004 | Wood et al. | 353/70 |

FOREIGN PATENT DOCUMENTS

| | | | |
|---|---|---|---|
| GB | 374786 | 6/1932 | |
| GB | 891092 | 3/1962 | |
| GB | 894664 | 4/1962 | |
| JP | 2002-268142 | * | 9/2002 |

* cited by examiner

Primary Examiner—W. B. Perkey
Assistant Examiner—Rochelle Blackman

(57) ABSTRACT

A method of monitoring an illumination source including a reflector and a lamp. A reference orientation is defined where the reflector and a light producing luminary of the lamp are aligned to optimize light intensity reflected from the luminary to a desired target. The orientation of the lamp is monitored, and changes from the reference orientation are reported as an indication of a reduction in light intensity reflected from the luminary toward the desired target.

16 Claims, 3 Drawing Sheets

TILT DETECTION IN ILLUMINATION SOURCE

BACKGROUND

Projectors are commonly used for displaying images on a screen. Projected images may be based on input video signals received from personal computers, television tuners, digital versatile disc players, video cassette players, or virtually any other device that outputs a video signal. Most projectors include a light source for generating a high-intensity or high luminance light that may be used to project the image onto the screen. The generated light may be directed through various mirrors, lenses, color wheels, and/or other optics, to produce the desired image on the screen. As a general rule, better images, with more appreciable contrast, may be produced in a variety of viewing room conditions by a relatively brighter light sources. Therefore, it is desirable to maximize the brightness of the light source and to minimize conditions which lead to less than optimal light intensity.

SUMMARY

A method of monitoring an illumination source including a reflector and a lamp is provided. A reference orientation is defined where the reflector and a light producing luminary of the lamp are aligned to optimize light intensity reflected from the luminary to a desired target. The orientation of the lamp is monitored, and changes from the reference orientation are reported as an indication of a reduction in light intensity reflected from the luminary toward the desired target.

DETAILED DESCRIPTION

Figure 1:
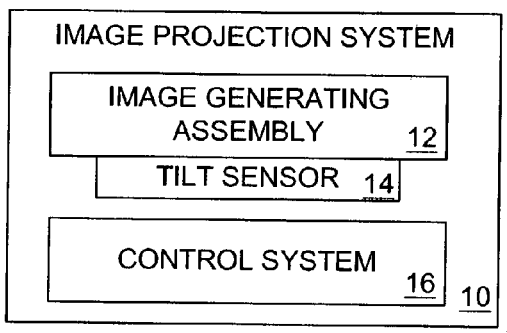
FIG. 1 is a schematic view of an image projection system for projecting images based on a received video signal.

FIG. 1 schematically shows an image projection system 10 that includes an image generating assembly 12, a tilt sensor 14, and a control system 16. Image generating assembly 12 is used to project images onto a screen or other viewing surface. As is described in detail below with reference to a particular embodiment of image generating assembly 12, the image generating assembly may be calibrated to produce optimal projected light intensity when aligned with one or more reference axes. Tilt relative to such axes may undesirably produce less than optimal projected light intensity. Tilt sensor 14 is used to detect tilt between the image generating assembly and the reference axes. Control system 16 is used to report tilt deviations detected by the tilt sensor. In this manner, a reduction in projected light intensity may be diagnosed and corrected.

Figure 2:
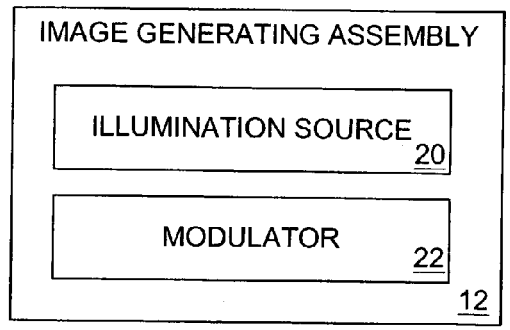
FIG. 2 is a schematic view of an image generating assembly as may be found in the image projection system of FIG. 1.

FIG. 2 schematically shows an exemplary image generating assembly 12. It should be understood that image generating assembly 12 is provided as a nonlimiting example of the variety of differently configured image generating assemblies within the scope of this disclosure. Image generating assembly 12 includes an illumination source 20 and a modulator 22. Illumination source 20 generates a relatively high intensity, or high luminance, light that is supplied to modulator 22. Modulator 22 is used to transform the light received from the illumination source into a projected image defined by a video signal. For each pixel described by the video signal, the modulator directs appropriately colored light to a corresponding location on the viewing surface, as is described in more detail below.

Figure 3:
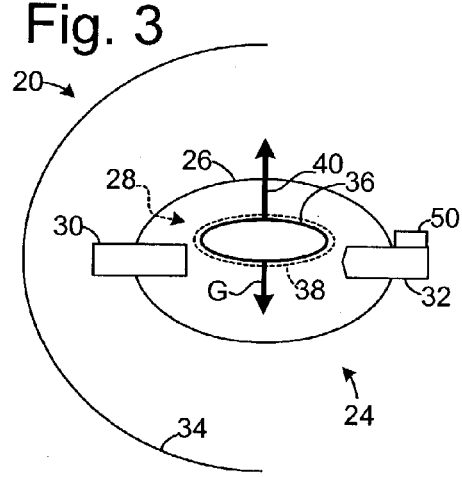
FIG. 3 shows an illumination source in a generally horizontal orientation, in which a plasma fireball is in a default position.

FIG. 3 schematically shows a nonlimiting example of an illumination source 20, including a plasma lamp 24. Examples of suitable plasma lamps include, but are not limited to, high pressure mercury lamps, high pressure xenon lamps, and high pressure sodium lamps. Lamp 24 includes an envelope 26 bounding a volume of plasma 28. Extending into the envelope of the plasma are a pair of electrodes, namely anode 30 and cathode 32. The lamp also includes a reflector 34, which may be shaped as a conic surface such as an ellipse, a parabolic surface, an aspheric surface, or with another appropriate shape for directing light to a desired target. Lamp 24 includes a tilt sensor 50, which may be mounted in a fixed position relative to the electrodes. The tilt sensor may be mounted to a housing or any other structure having a fixed relationship relative to the electrodes. In the illustrated embodiment, the tilt sensor is schematically shown attached to the electrodes to demonstrate that it is fixed relative to the electrodes. A voltage may be applied across the electrodes, causing the electrodes to arc and excite the plasma, which in turn produces a plasma fireball 36. The plasma fireball emits high luminance, or high intensity, light that may be directed to a modulator, or other desired target, by reflector 34 and/or optics such as mirrors and/or lenses. Plasma fireball 36 is a nonlimiting example of a luminary which generates light that may be directed towards a desired target.

Figure 4:
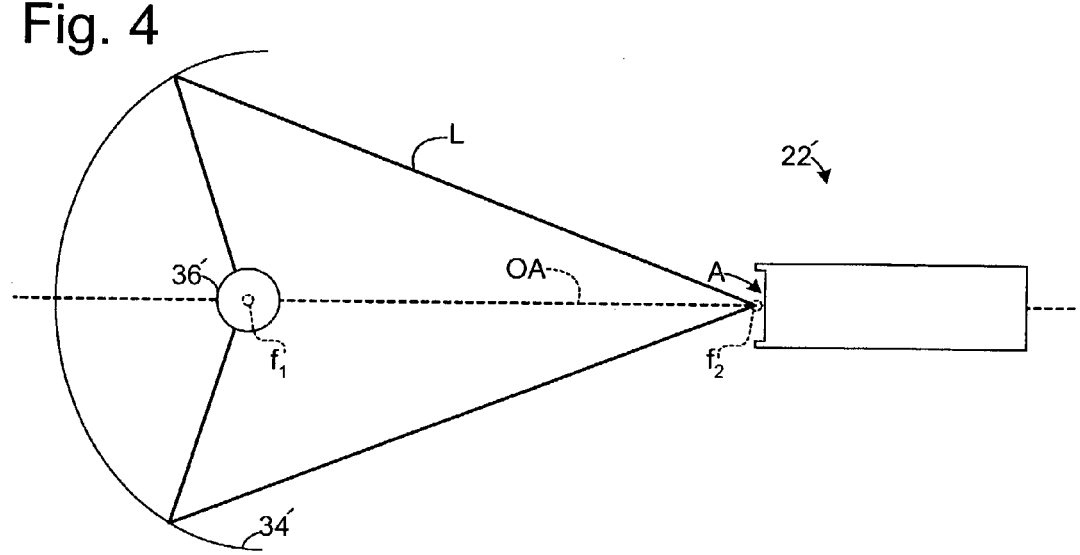
FIG. 4 shows a luminary aligned with the optical axis of a projection system to optimize light intensity directed to a modulator.
Figure 5:
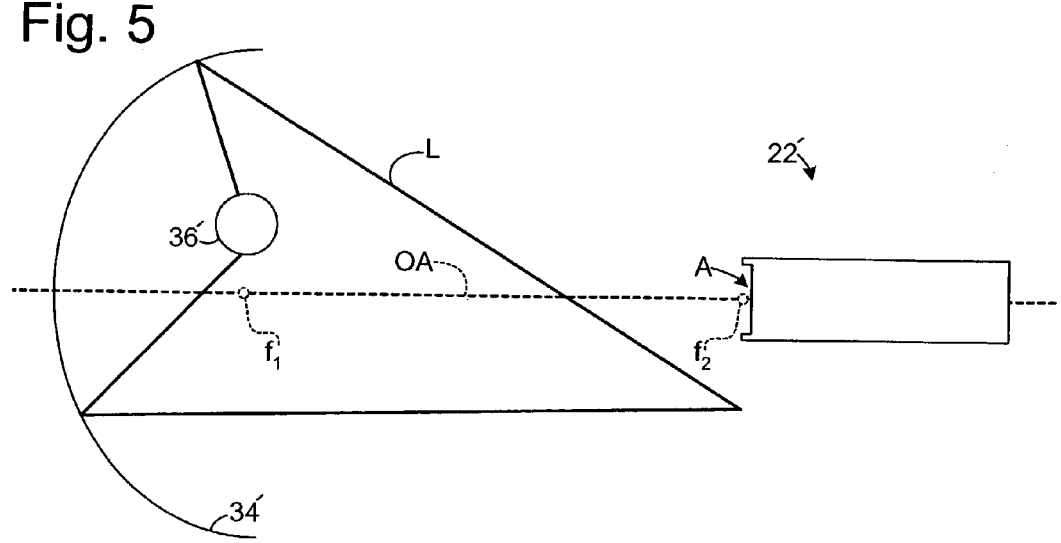
FIG. 5 shows a luminary that is not aligned with the optical axis of a projection system.

As shown in FIG. 4, reflector 34' may be aligned, or positioned, to maximize the intensity of light L directed to a desired target, such as a modulator 22'. In the case of an elliptical reflector, this usually involves positioning the reflector so that a plasma fireball 36' is aligned to an optical axis OA, and is positioned at a foci f1 of the reflector. In practice, modulator 22' may include an optical component, such as an integrating rod, for receiving light L from the reflector, and such component may have an aperture A through which light L may pass from the reflector. Such component may be aligned with the optical axis, with aperture A positioned at the other foci f2 of the reflector. The reflector is typically positionally fixed relative to the electrodes when the lamp is in a generally horizontal, right-side-up orientation, operating under normal conditions. The effectiveness of the reflector is related to proper alignment to a given plasma fireball position. Therefore, once the reflector is properly aligned, the intensity of light L directed to the desired target may decrease if the plasma fireball's position changes relative to the reflector, as is shown in FIG. 5. FIG. 5 is schematically illustrated to exaggerate the reduction in light L that passes through aperture A, and it should be understood that varying degrees of plasma fireball, or other luminary, misalignment may lead to varying amounts of light being directed to the desired target.

As can be seen in FIG. 3, plasma fireball 36 is located at a default position 38 between anode 30 and cathode 32. Default position 38 corresponds to a generally horizontal orientation of lamp 24. Plasma fireball 36 may generate a substantial amount of heat, which in turn may cause convection within envelope 38. Convection may influence the relative position of the plasma fireball so that the plasma fireball is raised in an upward direction opposite a gravitational force G. Other moveable luminaries may be similarly affected by convection and/or other forces. Convection vector 40 schematically illustrates the effect convection has on the plasma fireball, shifting the plasma fireball upward against gravity. Although convection vector 40 is shown to directly oppose gravity, it should be understood that the shape of the plasma envelope and/or other factors may skew convection vector 40. However, for a particular lamp, convection will typically produce a consistent force, which predictably influences the location of the plasma fireball. Convection may displace the plasma fireball off an axis of the electrodes generating the fireball, and such displacement may be anticipated. Alignment of the reflector to the plasma fireball may account for the displacement, and therefore default position 38 may be displaced from the axis of the anode and the cathode, yet positioned at a foci of the reflector, on the optical axis of the system. If the convective forces change significantly, the plasma fireball may move from its default position off the optical axis, which may decrease the amount of light reflected to a desired target, such as an aperture of a modulator.

Figure 6:
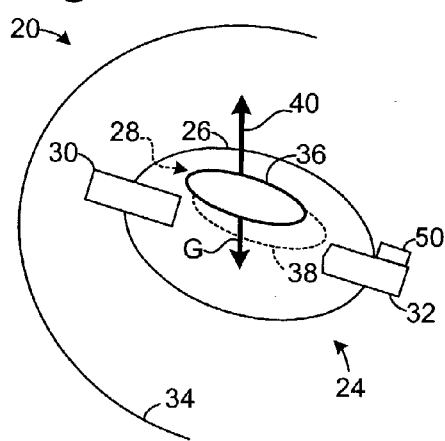
FIG. 6 shows the illumination source of FIG. 3 in a tilted orientation, in which the plasma fireball has moved from the default position.
Figure 7:
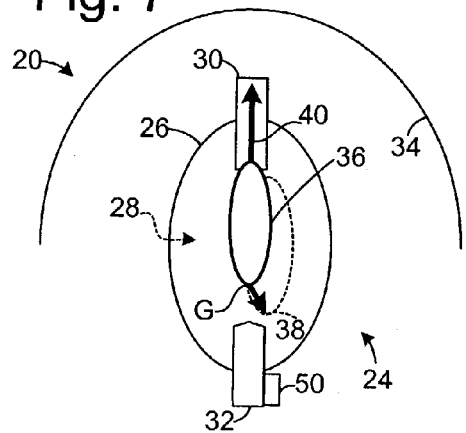
FIG. 7 shows an example of the illumination source of FIG. 3 tilted ninety degrees.

Changing the orientation of the lamp may also decrease the intensity of light reflected by the reflector to a desired target. As explained below, the plasma fireball may move from its default position on the optical axis, which may result in a decrease in the amount of light directed to the aperture of a modulator, or another desired target. As the lamp is rotated, the convection vector continues to oppose gravity, causing the relationship between the convection vector and the lamp to change. Thus, the relative position of the plasma fireball to the lamp may change, or in other words, the plasma fireball may leave default position 38. For example, FIG. 6 shows lamp 24 in a tilted orientation. Although the lamp is tilted, convection vector 40 continues to oppose gravity, and therefore does not tilt with the lamp. Therefore, plasma fireball 36 moves from default position 38. Because the reflector is typically aligned when the plasma fireball is in the default position, the intensity of light directed by the reflector may be less than optimal when the plasma fireball is not in the default position. Furthermore, as shown in FIG. 7, the lamp may be tilted so that convection causes a plasma fireball to at least partially engulf an electrode, which may damage the electrode and cause premature lamp failure.

The amount and/or direction that the plasma fireball shifts from its default position generally corresponds to the amount the lamp is tilted from the orientation in which it was calibrated (aligned for maximum light intensity), which may be referred to as a reference orientation. Greater amounts of tilt may move the plasma fireball farther from the aligned position, and therefore the light intensity directed towards a desired target, such as through a fixed area aperture on an optical axis of the system, may decrease. Therefore, it is desirable to detect tilt, so that misalignment may be diagnosed and corrected.

Figure 8:
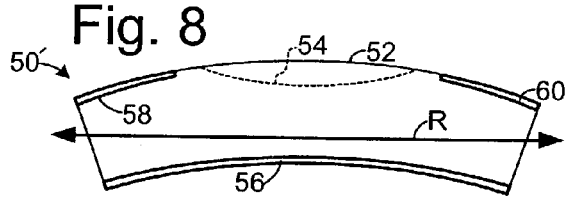
FIG. 8 shows a tilt detector designed to measure tilt of an object with respect to a reference axis.

FIG. 8 shows an exemplary tilt sensor 50'. Tilt sensor 50' may be configured to detect tilting of the electrodes. The tilt sensor may be positionally fixed in relationship to the electrodes, so that when the anode or cathode move, tilt sensor 50' moves. Bubble tilt sensors, mercury tilt sensors, and electrolytic sensors are nonlimiting examples of the various tilt sensors that may be implemented in image projection systems according to the present disclosure. Tilt sensors are provided as nonlimiting examples of instrumentation that may be used to monitor the orientation of an illumination source.

Figure 9:
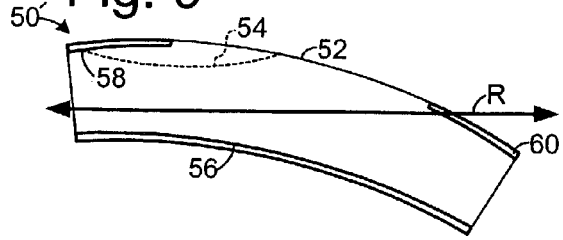
FIG. 9 shows the tilt detector of FIG. 6 in a tilted orientation.

Tilt sensor 50' includes an electrolytic sensor, which includes a vessel 52 that is partially filled with a conductive fluid 54. Absent acceleration, gravity dictates the position of fluid 54 within vessel 52. The tilt sensor also includes contacts 56, 58, and 60. When tilt sensor 50 is level, as in FIG. 8, the electrical impedance between contact 56 and contact 58 is the same as the electrical impedance between contact 56 and contact 60, because the same amount of conductive fluid 54 is between the respective pairs of contacts. When tilted, such as in FIG. 9, the impedance between contact 56 and contact 58 is not the same as the impedance between contact 56 and contact 60, because the amount of conductive fluid 54 between the respective contact pairs is not the same. There is relatively more conductive fluid between contacts 56 and 60 than there is between contacts 56 and 58. In general, the impedance differs in proportion to the amount the sensor is tilted. Therefore, the impedance between the sensors may be measured to determine the amount the sensor is tilted.

Figure 10:
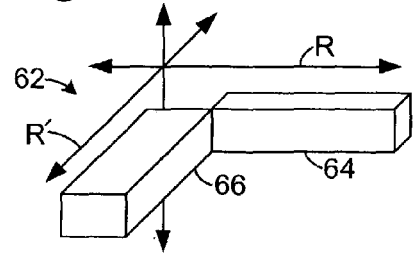
FIG. 10 schematically shows an example of a tilt detector configured to measure tilt relative to two axes.

Although tilt sensor 50' is only configured to measure tilt relative to one reference axis R, it should be understood that tilt sensors may be configured to measure tilt relative to more than one axis. For example, FIG. 10 schematically shows a tilt sensor 62 that includes a vessel 64 for measuring tilt along a reference axis R, and another vessel 66 for measuring tilt along a different reference axis R'. In such arrangements, the vessels may be orthogonally orientated relative to one another so that the sensor may conveniently measure azimuth and elevation, for example. In some embodiments, additional and/or alternative components may be incorporated into the tilt sensor. For example, the tilt sensor may include an orientation detector for determining if the image generating assembly is right side up, or upside down. Furthermore, the tilt sensor may include different vessels for measuring tilt when the image generating assembly is rotated past a predetermined threshold. The above tilt sensors are provided as examples, and it should be understood that other tilt sensors may alternatively be used.

As shown in FIG. 1, image projection system 10 includes a control system 16. A control system may by operatively coupled to a tilt sensor, and used to report tilt deviations, which are detected by the tilt sensor and exceed a predetermined minimum threshold. Deviations may be reported as exceeding an acceptable operating range, and/or as incremental values representing varying degrees of tilt. As an example of the first scenario, a control system may be programmed to consider tilt less than a predetermined minimum threshold (1°, 2°, 3°, 4°, 5°, 10°, 15°, etc.) within an acceptable operating range. For example, a predetermined minimum threshold of approximately ten degrees has been found to provide an acceptable operating range for most high-pressure mercury lamps, but other minimum thresholds may be set to facilitate optimization of a particular lamp. If the tilt exceeds the predetermined minimum threshold, the control system may be programmed to report that the projector is operating out of an acceptable range. This type of reporting does not necessarily include details regarding the precise amount the projector is tilted. As an example of the second scenario, the control system may more precisely report to what extent the projector is tilted, such as by providing a quantitative value indicating the degree of tilt. In some embodiments, the projector may report both an incremental value reflecting the relative amount of tilt and an indication whether such an amount exceeds an acceptable operating range.

Figure 11:
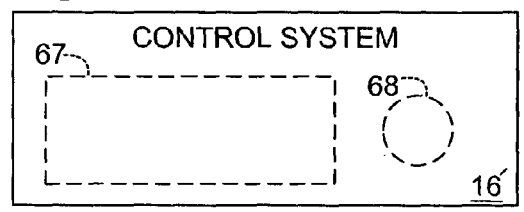
FIG. 11 schematically shows a control system used to report detected tilt.

Tilt variations may be "reported" via a variety of different mechanisms, depending on a particular implementation of the control system. As shown in FIG. 11, a control system 16' may include a screen 67, such as a liquid crystal display, that may be used to visually present the tilt deviation to a user, such as in the form of a tilt warning. Other more simple visual indicators, such as indicator lights, may additionally or alternatively be used. In some embodiments, the control system may send a video signal to the image generating assembly so that the image generating assembly may project a visual indication of the tilt deviation on display surface. The control system may additionally or alternatively include a sound transducer 68 for audibly sounding a tilt warning including a sound, series of sounds, synthesized message, recorded message, or other audible content conveying the tilt deviation to a user. In some embodiments, the control system may send a notification signal to an external device, such as a computing device, allowing the external device to recognize the misalignment and take appropriate action. Such a notification signal may be transmitted over a wired or wireless bus and/or network. The control system may additionally or alternatively report the tilt deviation by issuing a correction command to rectify the tilt, such as by automatically leveling the projector or realigning the plasma fireball to the optical axis of the system. If the measured tilt is indicative of a potentially damaging operation condition, such as an operating condition where the plasma fireball engulfs an electrode, light production may be stopped, so as to reduce the likelihood of permanent damage. In some embodiments, the measured tilt may be saved in a memory of the image projection system, in a lamp assembly application specific integrated circuit, or another internal and/or external device.

Once a tilt deviation is detected, correction may be accomplished through a variety of mechanisms to optimize light intensity. For example, the lamp may be leveled to remove the tilt. However, in some situations a user may purposefully intend for the lamp to remain tilted, while desiring optimal light intensity. For example, the user may mount an image projection system upside down on a ceiling, or sideways on a wall. In other situations, a user may have the lamp angled up or down so as to be aimed at a display surface that is above or below the projection system. In such situations, the user may install a lamp specially configured for the user's desired lamp orientation. In other words, if the user wants to operate the lamp with a ninety degree tilt, a ninety-degree lamp may be installed that is configured to produce a plasma fireball in the same position, or default position, that a standard lamp would produce a plasma fireball when operating in a horizontal orientation. In this manner, the resulting plasma fireball is properly aligned for optimal intensity. Lamps may be configured for a variety of lamp orientations so that the image projection system may be operated in a corresponding variety of tilted orientations. Such lamps may be configured with electrodes positioned differently in a plasma envelope so that when a plasma fireball is produced convection will move the plasma fireball into the desired default position, which may be on the optical axis of the system and/or at a foci of the reflector.

In some embodiments, the lamp may have a plurality of selectable positions for adjusting the plasma fireball position to produce optimal light intensity. For example, the envelope and electrodes may be moved into a selectable position that optimizes light intensity, for example by positioning the plasma fireball at a focus of an elliptical reflector. If the lamp is tilted, the envelope and electrodes may be repositioned into another selectable position that optimizes light intensity in the new tilted orientation, in which the plasma fireball may have moved out of the default position due to convection. Adjustments made to the lamp's arrangement may be performed manually, for example upon visual or audible instruction from the control system. In some embodiments, repositioning of the lamp may occur automatically. The control system may send a correction command to a realignment mechanism, configured to selectively reposition the lamp relative to the reflector, for example by using optomechanical alignment guides.

Figure 12:
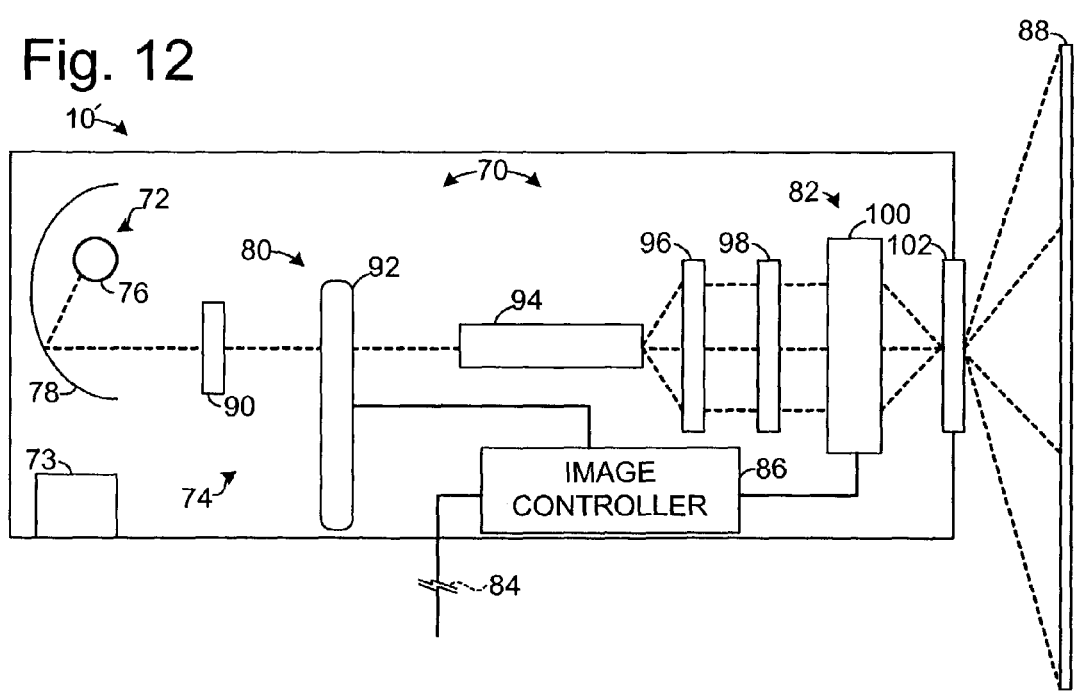
FIG. 12 schematically shows an unfolded image projection system.

FIG. 12 schematically shows an image projection system 10' including an image generating assembly 70. Image generating assembly 70 includes an illumination source 72, a modulator 74, and a tilt sensor 73. To simplify illustration of the image generating assembly 70, the image generating assembly has been optically "unfolded." Depending on the components of the image generating assembly, it may be configured so that light from the illumination source changes directions one or more times before leaving the projection system. The illumination source may include a plasma lamp 76, such as a mercury or xenon lamp, and a reflector 78, as described above. In the illustrated embodiment, modulator 74 includes a fixed and/or rotating color modulator 80 and a spatial light modulator 82. Image generating assembly 70 may be configured to modulate light and direct the modulated light, spatially and chromatically, to a display surface 88 according to a video signal 84 received by an image controller 86. In this manner, images based on, or defined by, the input video signal may be displayed on the display surface.

Illumination source 72 may produce white light, which may be directed through an infrared/ultraviolet filter 90 to color modulator 80. In FIG. 12, the color modulator includes a color wheel 92, although it should be appreciated that the color modulator may alternatively include another mechanism for modulating the color quality of light for projection. Color wheel 92 may include a multicolor filter that rapidly rotates in the light path between the illumination source and the spatial light modulator, sequentially filtering the illuminated light with segments having different light filtering properties. As one possible example, color wheel 92 may include red, green, and blue transmissive segments. The segments may be equally sized, for example, each having a central angle of one-hundred twenty degrees; or the segments may be weighted to filter the different colors unequally. Furthermore, additional and/or different colored segments may be included, such as a white light transmissive segment.

The color wheel filters white light from the illumination source according to the transmissive segment through which the light is directed. For example, when white light passes through a red transmissive segment, blue and green light is filtered and red light is transmitted. Color wheel 92 rotates so that the light from the illumination source is sequentially directed through the different segments. In this manner, the white light is filtered by the different segments, and the light output from the color wheel cyclically is characterized by wavelengths corresponding to the transmissive colors of the various segments of the color wheel. For example, as a red, green, and blue color wheel rotates, light passing through the color wheel continually changes from red to green to blue to red to green to blue, and so on.

Colored light from the color wheel may be sequentially projected onto spatial light modulator 82. The image generating assembly may include an integrating rod 94, condenser lens 96, and a field lens 98, which may be used to focus light from the color wheel onto the spatial light modulator. In the illustrated embodiment, the spatial light modulator includes a digital micromirror device 100. It should be understood that the spatial light modulator may alternatively include a transmissive modulator, such as a cathode ray tube or a liquid crystal display panel; a diffractive image forming element, such as a grating light valve, a reflective image forming element, such as a liquid crystal on silicon device, or an interference based image forming element, such as a transmissive or reflective interference based modulator.

The spatial light modulator of FIG. 12 may selectively direct light according to input received from image controller 86. As the light from the color modulator sequentially changes wavelength, the spatial light modulator may selectively direct the colored light to the proper locations on the display surface. In this manner, each pixel of the projected image may be individually controlled to sequentially display selected colors in the appropriate quantity to yield a desired perceived color. Each pixel may be controlled over time to appear as a particular color, and the individual pixels may collectively form a colored image. The perceived color of each pixel may be individually changed, and thus the collective image may be changed.

Light from the spatial light modulator may be directed through a projection lens assembly 102, that in turn directs the light onto the display surface. The projection lens assembly may be adjusted, either manually or automatically, so that the projected image may be properly focused on the projection surface. It should be appreciated that image generating assembly 70 may include additional or alternative optics, modulators, mirrors, focusing devices, and the like to assist in forming and projecting the desired image onto the display surface. Similarly, image projection system 10' may include additional componentry, such as a control system, networking subsystem, processor, memory, etc., which has not been illustrated or described in order to simplify the description of the image generating assembly.

Although described above in the context of an exemplary image projection system, a tilt sensor, or other orientation measuring device, may be used to optimize the light intensity projected from an illumination source in other image projection systems, as well as in applications other than image projecting. Furthermore, tilt sensors may be used to diagnose and/or correct other characteristics of an illumination source or image projection system. In this respect, control systems of the present disclosure may be programmed to make such a diagnoses and/or correction.

Although the present disclosure has been provided with reference to the foregoing operational principles and embodiments, it will be apparent to those skilled in the art that various changes in form and detail may be made without departing from the spirit and scope defined in the appended claims. The present disclosure is intended to embrace all such alternatives, modifications and variances that fall within the scope of the appended claims. Where the disclosure or claims recite "a," "a first," or "another" element, or the equivalent thereof, they should be interpreted to include one or more such elements, neither requiring nor excluding two or more such elements.

What is claimed is:

1. A method of making a projector having an image generating assembly, comprising:

optimizing light intensity reflected by a reflector of an illumination source when the image generating assembly is aligned with at least one reference axis, the light intensity being related to position of a luminary relative to the reflector;

associating a tilt sensor with the image generating assembly to determine a tilt of the image generating assembly relative to the reference axis, wherein tilt of the image generating assembly effects positional change of the luminary relative to the reflector; and operatively coupling a control system to the tilt sensor, wherein the control system is configured to report tilt of the image generating assembly relative to the reference axis that exceeds a predetermined minimum threshold to diagnose a decrease in light intensity of the illumination source.

2. The method of claim 1, wherein optimizing light intensity includes positioning the luminary at a focus of the reflector.

3. An image projection system, comprising:

an image generating assembly configured to receive an input signal and project an image based on the input signal, the image generating assembly including an illumination source with a light intensity related to position of a luminary relative to a reflector, light intensity being optimized when the image generating assembly is aligned with at least one reference axis; and a tilt sensor configured to diagnose a decrease light intensity of the illumination source due to a gravitational shift of the luminary upon determining a tilt between the image generating assembly and the at least one reference axis.

4. The image projection system of claim 3, wherein the tilt sensor is configured to determine tilt between the illumination source and at least one reference axis.

5. The image projection system of claim 4, wherein the illumination source is configured to be selectively adjusted to optimize projected light intensity.

6. The image projection system of claim 4, wherein the tilt sensor is positioned in a fixed relationship relative to the illumination source.

7. The image projection system of claim 3, wherein a control system is operatively coupled to the tilt sensor and configured to report the determined tilt.

8. The image projection system of claim 7, wherein the control system includes a screen configured to visually report the determined tilt.

9. The image projection system of claim 7, wherein the control system includes a video output configured to send a video signal to the image generating assembly to project a visual report of the determined tilt onto a display surface.

10. The image projection system of claim 7, wherein the control system includes a sound transducer configured to audibly report the determined tilt.

11. The image projection system of claim 3, wherein the illumination source, comprises:
 an envelope bounding a volume of electrically conductive plasma;
 an anode extending into the envelope;
 a cathode extending into the envelope, wherein the anode and the cathode are collectively configured to generate a plasma fireball in the envelope; and
 a reflector configured to reflect light from the plasma fireball to a modulator of the image projection system.

12. The image projection system of claim 11, wherein the electrically conductive plasma includes high-pressure mercury plasma.

13. The image projection system of claim 11, wherein the electrically conductive plasma includes high-pressure xenon plasma.

14. An image projection system, comprising:
 means for receiving an input signal;
 means for projecting an image based on the input signal, the means for projecting including an illumination source with a light intensity related to position of a luminary relative to a reflector; and
 means for diagnosing a decrease in light intensity of the illumination source by monitoring an orientation of the image projection system, wherein a change in orientation of the image projection system effects a gravitational shift of the luminary relative to the reflector.

15. The image projection system of claim 14, further comprising means for increasing projected light intensity by adjusting the orientation of at least a portion of the image projection system.

16. The image projection system of claim 14, further comprising means for reporting the diagnosed decrease in projected light intensity.

* * * * *